United States Patent [19]

Fukui et al.

[11] Patent Number: 5,620,500
[45] Date of Patent: Apr. 15, 1997

[54] DEHUMIDIFYING METHOD

[75] Inventors: Motoo Fukui; Junjiro Iwamoto, both of Yokohama; Kei Nishii, Ichihara, all of Japan

[73] Assignee: Asahi Glass Company Ltd., Tokyo, Japan

[21] Appl. No.: 418,445

[22] Filed: Apr. 7, 1995

[30] Foreign Application Priority Data

Apr. 8, 1994 [JP] Japan .................................. 6-071094

[51] Int. Cl.⁶ ............................. B01D 53/22; B01D 53/26
[52] U.S. Cl. ........................................... 95/52; 96/12
[58] Field of Search .................................. 95/45, 52; 96/8, 96/10, 12

[56] References Cited

U.S. PATENT DOCUMENTS

| | | | |
|---|---|---|---|
| 3,735,558 | 5/1973 | Skarstrom et al. | 95/51 |
| 3,735,559 | 5/1973 | Salemme | 95/52 |
| 4,515,761 | 5/1985 | Plotzker | 95/52 X |
| 4,684,376 | 8/1987 | Percec et al. | 95/52 X |
| 4,718,921 | 1/1988 | Makino et al. | 95/52 |
| 4,741,744 | 5/1988 | Wu et al. | 95/47 |
| 4,844,719 | 7/1989 | Toyomoto et al. | 95/52 |
| 4,909,810 | 3/1990 | Nakao et al. | 95/52 |
| 5,059,327 | 10/1991 | Takegami | 210/500.34 |
| 5,160,511 | 11/1992 | Lovelock | 95/52 |
| 5,191,151 | 3/1993 | Eriksen et al. | 95/52 X |
| 5,364,454 | 11/1994 | Bikson et al. | 95/52 |

FOREIGN PATENT DOCUMENTS

| | | | |
|---|---|---|---|
| 0308002 | 3/1989 | European Pat. Off. | 95/52 |
| 0326083 | 8/1989 | European Pat. Off. . | |
| 61-187918 | 8/1986 | Japan | 95/52 |
| 61-229830 | 10/1986 | Japan | 95/52 |
| 62-192589 | 8/1987 | Japan | 95/52 |
| 2-293032 | 12/1990 | Japan | 95/52 |
| 2214103 | 8/1989 | United Kingdom | 95/52 |

*Primary Examiner*—Robert Spitzer
*Attorney, Agent, or Firm*—Oblon, Spivak, McClelland, Maier & Neustadt, P.C.

[57] ABSTRACT

A dehumidifying method which comprises contacting a gas containing water vapor to one side of a vapor permselective membrane, while contacting a dry gas to the other side of the membrane, to let the water vapor selectively permeate through the membrane, wherein the membrane is made of an ion exchange membrane having ion exchange groups, of which counter ions are partly or entirely substituted by metal ions.

11 Claims, No Drawings

DEHUMIDIFYING METHOD

The present invention relates to a dehumidifying method which comprises selectively permeating and separating water vapor or moisture component from a fluid mixture. More particularly, it relates to a method for selectively permeating and separating water vapor from a gas containing moisture, in the production of dehumidified or dry air for air conditioning in buildings or compressed air for instrumentation, in the removal of moisture in natural gases and in the production of a gas having the humidity controlled, which is used in a wide range of fields including chemical industry, electric and electronic industry, precision machinery industry, food industry, fiber industry, etc.

Methods for removing water vapor in gases may generally be classified into four methods i.e. a compression method, a cooling method, an adsorption method and a membrane separation method.

The membrane separation method is a method wherein a gas containing water vapor is contacted to one side of a vapor permselective membrane, and a dry gas is contacted to the other side of the membrane, so that the water vapor is selectively permeated and separated through the membrane. In principle, it has merits over other three methods such that the running cost is low, the structure of the apparatus is simple, and dry air can continuously be obtained without polluting air. As a vapor permselective membrane excellent in permeability of water vapor, an ion exchange membrane as well as a dehumidifying method using such membrane has been proposed by U.S. Pat. No. 3,735,558 and 4,909,810, Japanese Unexamined Patent Publications No. 189326/1989 and No. 293032/1990. However, such a membrane and a dehumidifying method have a drawback that when used for a long period of time, particularly under a high temperature and high pressure condition, the membrane is likely to rupture, and no adequate durability is obtained in continuous use for a long period of time.

It is an object of the present invention to overcome the above mentioned drawback of the prior art and to provide a dehumidifying method which is durable for continuous use for a long period of time, particularly even under a high temperature and high pressure condition. A further object of the present invention is to provide a dehumidifying method which can be used for the production of compressed air for an air conditioner or instrumentation apparatus and which can be used continuously for a long period of time for moisture removal of natural gases or for moisture removal of corrosible gases to which the prior art can not be applied.

The present invention provides a dehumidifying method which comprises contacting a gas containing water vapor to one side of a vapor permselective membrane, while contacting a dry gas to the other side of the membrane, to let the water vapor selectively permeate through the membrane, wherein the membrane is made of an ion exchange membrane having ion exchange groups, of which counter ions are partly or entirely substituted by metal ions.

Now, the present invention will be described in detail with reference to the preferred embodiments.

The above mentioned ion exchange membrane having ion exchange groups, of which counter ions are partly or entirely substituted by metal ions, can be obtained by immersing preferably an ion exchange membrane wherein ion exchange groups are of an acid type, in an aqueous solution containing a metal salt, preferably at a temperature of from 10° to 90° C., more preferably from 40° to 60° C., for from a few minutes to a few tens hours. In such a case, when only a part of counter ions of the ion exchange groups are substituted by metal ions, for example, by substituting the counter ions of the ion exchange groups only at the surface layer of the ion exchange membrane or only at one side of the membrane, it is possible to obtain a vapor permselective membrane excellent in the balance of the dehumidifying performance and the mechanical strength, although such may also depend upon the material of the ion exchange membrane.

As the metal ions, monovalent, bivalent or trivalent metal ions may, for example, be used. These metal ions may be applied to the membrane in the form of a suitable water-soluble metal salt such as a chloride or a nitrate. Preferred metal ions include, for example, monovalent $Li^+$, $K^+$ and $Na^+$, bivalent $Ca^{2+}$, $Ni^{2+}$, $Co^{2+}$, $Cu^{2+}$, $Pb^{2+}$, $Sn^{2+}$, $Mg^{2+}$, $Zn^{2+}$ and $Be^{2+}$, and trivalent $Al^{3+}$ and $Fe^{3+}$. Bivalent or trivalent metal ions, especially $Al^{3+}$ are particularly preferred, since they serve to improve the mechanical strength, and they are excellent in the water vapor or moisture permeability.

The ion exchange capacity of the ion exchange membrane to be used in the present invention is preferably from 0.6 to 2.5 meq/g dry resin, more preferably from 1.0 to 2.0 meq/g dry resin, to obtain a membrane excellent in the water vapor permeability and to obtain the membrane strength.

The ion exchange groups of the ion exchange membrane to be used in the present invention may, for example, be cation exchange groups such as sulfonic acid groups, carboxylic acid groups or phosphoric acid groups. Sulfonic acid groups are particularly preferred, since they have high water absorptivity and they are excellent in heat resistance and chemical resistance.

The material of the ion exchange membrane may, for example, be a styrene-type resin, an ethylene-type resin, a polysulfone-type resin or a fluorine-containing resin. A fluorine-containing resin, particularly a fluorine-containing copolymer containing a repeating unit of the following formula:

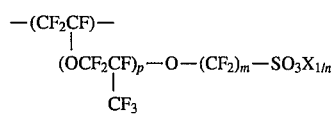

wherein X is a metal atom, p is 0 or 1, m is an integer of from 1 to 5, and n is the valency of metal atom X, is preferred in view of the heat resistance, chemical resistance, moldability and mechanical properties, particularly since it is less susceptible to rupture due to swelling or shrinkage. The composition of the copolymer is selected so that the fluorine-containing copolymer will have the above mentioned ion exchange capacity.

The above mentioned fluorine-containing copolymer is preferably the one obtained by treating with an aqueous alkaline solution a copolymer of a fluorinated olefin such as tetrafluoroethylene, vinylidene fluoride or vinyl fluoride with a —$SO_2F$ group-containing perfluorovinylether monomer of the following formula:

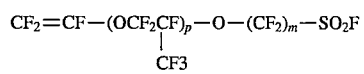

wherein p and m are as defined above. Further, if necessary, a third component such as ethylene, propylene or perfluoroacetone may be copolymerized.

The above copolymer may be formed into a membrane by a conventional method, and such a membrane may be used by itself as the vapor permselective membrane in the present invention. However, it is preferred that such an ion exchange membrane is formed into a composite membrane with a porous substrate from the viewpoint of the pressure resistance and processability into a module. Such a composite membrane is particularly preferred to obtain a vapor permselective membrane made of an ion exchange membrane having a thickness of not more than 30 µm.

The porous substrate to be used in the present invention may be the one which preferably has a pore diameter of from 0.01 to 100 µm and a thickness of from 10 to 500 µm and which has a gas permeability and durability with respect to the dimensional stability and mechanical strength. As such a porous substrate, a woven fabric, a non-woven fabric or a fine porous body made of fiber of a fluorine-containing polymer such as polyvinylfluoride or polyvinylidene fluoride, fiber of an olefin polymer such as polyethylene or polypropylene, polyester fiber, nylon fiber, vegetable fiber or carbon fiber, may, for example, be mentioned.

As a method for forming a composite membrane of such a porous substrate with an ion exchange membrane, there may, for example, be mentioned a method wherein an ion exchange resin for an ion exchange membrane is formed into a membrane and then laminated with a porous substrate, or a method wherein a porous substrate is impregnated with a solution, a suspension, an emulsified latex or such an emulsified latex having water thereof substituted with an organic solvent, of an ion exchange resin, and such an impregnated substrate is dried.

The ion exchange membrane used as the vapor permselective membrane in the present invention, may be used in the form of a hollow fiber or tube. Further, it may be used in the form of a composite hollow fiber formed by a method in which a hollow porous substrate is impregnated with a liquid containing the ion exchange resin for forming the ion exchange membrane and then dried.

The ion exchange membrane thus obtained is, if the counter ions of the ion exchange groups are not yet substituted by metal ions, hydrolyzed preferably with an aqueous alkaline solution to change the counter ions of the ion exchange groups into alkali metal ions, to obtain an alkali-type ion exchange membrane.

To obtain an ion exchange membrane substituted by metal ions other than alkali metals, counter ions of such an alkali-type ion exchange membrane or a proton type ion exchange membrane having counter ions of the ion exchange groups substituted with protons by immersing such an alkali type ion exchange membrane in an acid solution, are partly or entirely substituted by metal ions other than alkali metals, for example, by immersing the membrane in an aqueous solution of a metal salt other than the alkali metals, as described above.

By contacting a gas containing water vapor or moisture to one side of the vapor permselective membrane made of the ion exchange membrane thus obtained, while contacting a dry gas to the other side of the membrane, it is possible to selectively permeate water vapor through the membrane to remove the moisture. As a specific apparatus to carry out such a method of the present invention, any known module apparatus may be employed.

With the ion exchange membrane of the present invention, wherein the counter ions of the ion exchange groups are substituted by metal ions, the mechanical strength can be improved while maintaining the dehumidifying performance. Such a mechanism may be explained as follows. Namely, ion crosslinkages are formed among ion exchange groups with metal ions serving as intermediary, to form a network structure. However, such an explanation is given for better understanding of the present invention and by no means is intended to restrict the present invention.

Now, the present invention will be described in detail with reference to Examples. However, it should be understood that the present invention is by no means restricted to such specific Examples.

EXAMPLE 1

Tetrafluoroethylene and $CF_2=CFOCF_2CF(CF_3)OCF_2CF_2SO_2F$ were copolymerized to obtain a copolymer having an ion exchange capacity of 1.1 meq/g dry resin. This copolymer was melt extrusion-molded to obtain hollow fibers each having an outer diameter of 550 µm and an inner diameter of 35 µm. The hollow fibers were hydrolyzed in a 3N potassium hydroxide aqueous solution at 40° C. for 16 hours, then washed with water and dried to obtain K-type hollow fibers wherein ion exchange groups were converted to $-SO_3K$.

Further, the K-type hollow fibers were immersed in 1N hydrochloric acid at 40° C. for 16 hours, then washed with water and dried, to obtain H-type hollow fibers wherein the ion exchange groups were converted to $-SO_3H$, which was used for the following Comparative Example.

The K-type hollow fibers obtained above, were immersed in a 1N aluminum chloride aqueous solution at 40° C. for 16 hours to obtain Al-type hollow fibers wherein the ion exchange groups were converted to $-SO_3Al_{1/3}$. A hollow fiber-type module having 250 Al-type hollow fibers assembled in a cylinder or a module casing having an inner diameter of 13 mm and a length of 10 cm, was prepared. To the inside of the hollow fibers of such a hollow fiber-type module, water of 25° C. 40° C. or 60° C. was injected, and the pressure until the hollow fiber ruptured, were measured and taken as the pressure resistance. The results are shown in Table 1.

COMPARATIVE EXAMPLE

In the same manner as in Example 1, a hollow fiber-type module was prepared by using the H-type hollow fibers, and the pressure resistance of the hollow fibers was measured in the same manner as in Example 1. The results are shown in Table 1.

Thus, with the Al-type hollow fibers of Example 1, adequate pressure resistance was obtained, as compared with the H-type hollow fibers of Comparative Example. On the other hand, with respect to the water vapor permeability, an air of 7 kg/cm² at 20° C. was supplied at a rate of 20 l/min (calculated under atmospheric pressure) using the above hollow-fiber type modules, and 4 l/min of the dry air obtained under atmospheric pressure was used for purging, and 6 l/min was taken out as a product dry air, whereby the dew point of the dry air was −27° C. with the H-type hollow fibers and −24° C. with the Al-type hollow fibers, thus indicating only a slight decrease in the dehumidifying performance.

TABLE 1

|   | 25° C. | 40° C. | 60° C. |
| --- | --- | --- | --- |
| (Example) Al-type hollow fiber | 55 kg/cm² | 45 kg/cm² | 36 kg/cm² |
| (Comparative Example) H-type hollow fiber | 35 kg/cm² | 30 kg/cm² | 25 kg/cm² |

EXAMPLE 2

A module having Al-type hollow fibers assembled as described in Example 1 was put into a constant temperature chamber adjusted at 80° C., and continuous operation was carried out while supplying a saturated compressed air of 7 kg/cm² adjusted at 80° C. to the module, whereby the operation was continued for 150 days without any problem.

According to the present invention, dehumidifying can be accomplished with excellent dehumidifying performance for a long period of time, even under a high temperature and high pressure condition. Further, dehumidifying a corrosive gas can be continuously conducted for a long period of time, which can not be performed by the prior art.

What is claimed is:

1. A dehumidifying method which comprises contacting at elevated temperature and pressure, a compressed gas containing water vapor on one side of a vapor permselective membrane, while contacting a dry gas to the other side of the membrane, to let the water vapor selectively permeate through the membrane, wherein the membrane is made of an ion exchange membrane having ion exchange groups, of which counter ions are partly or entirely substituted by multivalent metal ions, wherein the ion exchange membrane is made of a fluorine-containing copolymer containing a repeating unit of the following formula:

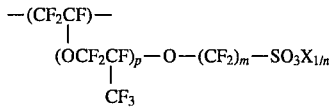

wherein X is a metal atom, p is 0 or 1, m is an integer of from 1 to 5, and n is the valency of metal atom X, and the metal ions are selected from the group consisting of $Ca^{2+}$, $Ni^{2+}$, $Co^{2+}$, $Cu^{2+}$, $Pb^{2+}$, $Sn^{2+}$, $Mg^{2+}$, $Zn^{2+}$, $Be^{2+}$, $Al^{3+}$, and $Fe^{3+}$, said ion exchange membrane being a hollow fiber or a tube.

2. The dehumidifying method according to claim 1, wherein the ion exchange membrane is a composite membrane with a gas permeable porous substrate.

3. The dehumidifying method according to claim 1, wherein the metal ions are $Al^{3+}$ or $Fe^{3+}$.

4. The dehumidifying method according to claim 3, wherein the metal ion is $Al^{3+}$.

5. The dehumidifying method according to claim 1, wherein the ion exchange membrane has an ion exchange capacity from 0.6 to 2.5 meq/g of dry exchange resin.

6. The dehumidifying method according to claim 5, wherein the ion exchange capacity is from 1.0 to 2.0 meq/g of dry exchange resin.

7. The dehumidifying method according to claim 1, wherein the metal ions form ion crosslinkages between the ion exchange groups.

8. The dehumidifying method of claim 1, wherein the ion exchange membrane has a pressure resistance of 36–55 kg/cm².

9. The dehumidifying method of claim 1, wherein said dry gas which contacts the other side of said membrane consists essentially of compressed air.

10. The dehumidifying method of claim 1, wherein said counter ions of the ion exchange groups are substituted by metal ions only at the surface layer of the ion exchange membrane.

11. The dehumidifying method of claim 1, wherein said counter ions of the ion exchange groups are substituted by metal ions only at one side of the membrane.

* * * * *